United States Patent
Teng et al.

(10) Patent No.: US 11,927,601 B2
(45) Date of Patent: Mar. 12, 2024

(54) PERSISTENT TWO-STAGE ACTIVITY RECOGNITION

(71) Applicant: QUALCOMM Incorporated, San Diego, CA (US)

(72) Inventors: Diyan Teng, Santa Clara, CA (US); Junsheng Han, Los Altos Hills, CA (US); Raehan Ahmed Syed, Chicago, IL (US); Rashmi Kulkarni, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/463,451

(22) Filed: Aug. 31, 2021

(65) Prior Publication Data

US 2023/0065124 A1    Mar. 2, 2023

(51) Int. Cl.
*G01P 13/00* (2006.01)

(52) U.S. Cl.
CPC ................................ *G01P 13/00* (2013.01)

(58) Field of Classification Search
CPC ....................................................... G01P 13/00
USPC ........................................................... 702/150
See application file for complete search history.

(56) References Cited

U.S. PATENT DOCUMENTS

| | | | | |
|---|---|---|---|---|
| 2014/0038674 A1* | 2/2014 | Srinivasan | ........ | H04W 52/0251 455/574 |
| 2015/0295945 A1* | 10/2015 | Canzanese, Jr. | ........ | G06F 21/55 726/23 |
| 2019/0212432 A1* | 7/2019 | DiPoala | ................ | G01S 13/886 |
| 2020/0160535 A1* | 5/2020 | Ali Akbarian | ........... | G06N 5/02 |
| 2020/0235758 A1* | 7/2020 | Khude | ................... | G06N 20/00 |

OTHER PUBLICATIONS

Cheng T., et al., "Data-Triggered Approach for Real-Time Machine Learning in IoT Systems", 2020 IEEE 63rd International Midwest Symposium on Circuits and Systems (MWSCAS), IEEE, Aug. 9, 2020, pp. 101-104, XP033819041, [retrieved on Sep. 1, 2020].
International Search Report and Written Opinion—PCT/US2022/041097—ISA/EPO—dated Dec. 19, 2022.

* cited by examiner

*Primary Examiner* — Alesa Allgood
*Assistant Examiner* — Byung Ro Lee
(74) *Attorney, Agent, or Firm* — Seyfarth Shaw LLP

(57) ABSTRACT

A method for energy-efficient state change detection and classification of streaming sequential data includes receiving via a first prediction model, sequential data from a sensor. The first prediction model determines a change in an activity state based on the sequential data. An indication that the activity state has changed is transmitted to a second prediction. The second prediction model determines an updated activity state based on the sequential data. The updated activity state is sent to the first prediction model, after which the second prediction enters an inactive state.

13 Claims, 7 Drawing Sheets

PERSISTENT TWO-STAGE ACTIVITY RECOGNITION

FIELD OF THE DISCLOSURE

Aspects of the present disclosure generally relate to predictions and more particularly to activity recognition.

BACKGROUND

Activity recognition is the problem of predicting the movements of a human or an object. Activity recognition aims to detect and classify the action of the human from a series of observations. The understanding this user activity context is broadly applicable, with use cases in healthcare, navigation, notification, and security, for example. However, many applications involve continuous observation and classification. Thus, such activity recognition systems involve significant power and memory consumption. These costs are exacerbated when activity recognition is applied in the context of mobile devices such as smartphones.

SUMMARY

The present disclosure is set forth in the independent claims, respectively. Some aspects of the disclosure are described in the dependent claims.

In an aspect of the present disclosure, a method for energy-efficient state change detection and activity recognition is provided. The method includes receiving, via a first prediction model, sequential data from a sensor. The method also includes determining, via the first prediction model, a change in an activity state based on the sequential data. Additionally, the method includes transmitting, to a second prediction model, an indication that the activity state has changed, the second prediction model determining an updated activity state based on the sequential data.

In an aspect of the present disclosure, an apparatus for energy-efficient state change detection and activity recognition is provided. The apparatus includes a memory and one or more processors coupled to the memory. The processor(s) are configured to receive, via a first prediction model, sequential data from a sensor. The processor(s) are also configured to determine, via the first prediction model, a change in an activity state based on the sequential data. In addition, the processor(s) are configured to transmit, to a second prediction model, an indication that the activity state has changed, the second prediction model determining an updated activity state based on the sequential data.

In an aspect of the present disclosure, an apparatus for energy-efficient state change detection and activity recognition is provided. The apparatus includes means for receiving, via a first prediction model, sequential data from a sensor. The apparatus also includes means for determining, via the first prediction model, a change in an activity state based on the sequential data. Additionally, the apparatus includes means for transmitting, to a second prediction model, an indication that the activity state has changed, the second prediction model determining an updated activity state based on the sequential data.

In an aspect of the present disclosure, a non-transitory computer readable medium is provided. The computer readable medium has encoded thereon program code for energy-efficient state change detection and activity recognition. The program code is executed by a processor and includes code to receive, via a first prediction model, sequential data from a sensor. The program code also includes code to determine, via the first prediction model, a change in an activity state based on the sequential data. Furthermore, the program code includes code to transmit, to a second prediction model, an indication that the activity state has changed, the second prediction model determining an updated activity state based on the sequential data.

In an aspect of the present disclosure, a method for energy-efficient state change detection and activity recognition is provided. The method includes receiving sequential data from a sensor. The method also includes receiving, from a first prediction model, a state change event indicating whether an activity state has changed from a prior activity state. Additionally, the method includes processing, responsive to the state change event indicating that the activity state has changed, the sequential data to determine a classification of the sequential data.

In an aspect of the present disclosure, an apparatus for energy-efficient state change detection and activity recognition is provided. The apparatus includes a memory and one or more processors coupled to the memory. The processor(s) are configured to receive sequential data from a sensor. The processor(s) are also configured to receive, from a first prediction model, a state change event indicating whether an activity state has changed from a prior activity state. In addition, the processor(s) are configured to process, responsive to the state change event indicating that the activity state has changed, the sequential data to determine a classification of the sequential data.

In an aspect of the present disclosure, an apparatus for energy-efficient state change detection and activity recognition is provided. The apparatus includes means for receiving sequential data from a sensor. The apparatus also includes means for receiving, from a first prediction model, a state change event indicating whether an activity state has changed from a prior activity state. Additionally, the apparatus includes means for processing, responsive to the state change event indicating that the activity state has changed, the sequential data to determine a classification of the sequential data.

In an aspect of the present disclosure, a non-transitory computer readable medium is provided. The computer readable medium has encoded thereon program code for energy-efficient state change detection and activity recognition. The program code is executed by a processor and includes code to receive sequential data from a sensor. The program code also includes code to receive, from a first prediction model, a state change event indicating whether an activity state has changed from a prior activity state. Furthermore, the program code includes code to process, responsive to the state change event indicating that the activity state has changed, the sequential data to determine a classification of the sequential data.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIGS. 2A, 2B, and 2C are diagrams illustrating a neural network, in accordance with aspects of the present disclosure.

DETAILED DESCRIPTION

Figure 1:
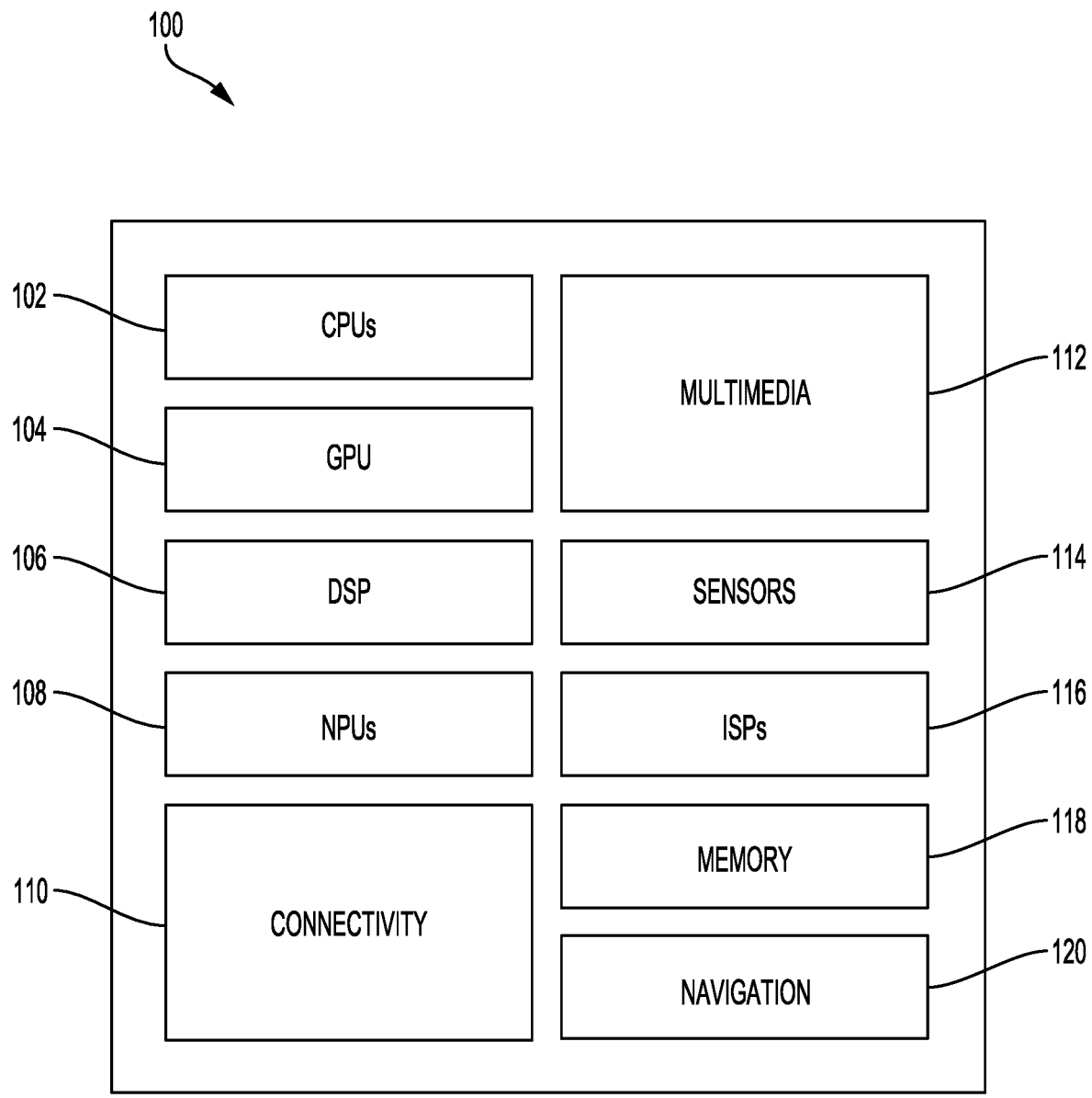
FIG. 1 illustrates an example implementation of a system-on-a-chip (SOC), including a general-purpose processor, in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Many streaming data input sources, such as camera previews, video files, audio recordings, inertial measurement unit (IMU) data, radar data, and Wi-Fi data, for instance, provide sequential data or data organized in a sequence of time slices with substantial temporal similarity. That is, many, and in some cases a majority of, the data in successive time slices for such input sources are in the same distribution and a small proportion of the time slices change the distribution such that a new classification may be indicated. As such, significant resources may be expended repeatedly computing predictions or classifications to produce the same result for many successive time slices.

To improve energy efficiency and maintain model accuracy, aspects of the present disclosure are directed to a two-stage sequential activity change detection and activity recognition system. In some aspects, a state change detection component may be integrated into a computing device, such as a smartphone, fitness tracker, Internet of things (IoT) device, or a sensor, for example.

Additionally, in some aspects, a prediction model may generates a score for a possible inference and aggregates the scores over time. The prediction model may be a logistic regression model, for example. In some aspects, a boosting approach may also be employed. For instance, boosted decision trees may provide an efficient hardware friendly model for implementation. In some examples, multiple weak learners may generate predictions. Each of the weak learners may be a decision tree. The predictions of each weak learner may be weighted and combined to generate a strong prediction. In some aspects, the inference model may include an artificial neural network such as a convolutional neural network, for example.

FIG. 1 illustrates an example implementation of a system-on-a-chip (SOC) 100, which may include a central processing unit (CPU) 102 or a multi-core CPU configured to detect and classify activity state changes in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the CPU 102 may comprise code to receive via a first prediction model, sequential data from a sensor. The instructions loaded into the CPU 102 may also comprise code to determine via the first prediction model, a change in an activity state based on the sequential data. The instructions loaded into the CPU 102 may additionally comprise code to transmit to a second prediction model, an indication that the activity state has changed. The second prediction model determines an updated activity state based on the sequential data.

The SOC 100 may be based on an ARM instruction set. In an aspect of the present disclosure, the instructions loaded into the CPU 102 may comprise code to receive sequential data from a sensor. The instructions loaded into the CPU 102 may also comprise code to receive, from a first prediction model, a state change event indicating whether an activity state has changed from a prior activity state. The instructions loaded into the CPU 102 may additionally comprise code to process, responsive to the state change event indicating that the activity state has changed, the sequential data to determine a classification of the sequential data.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
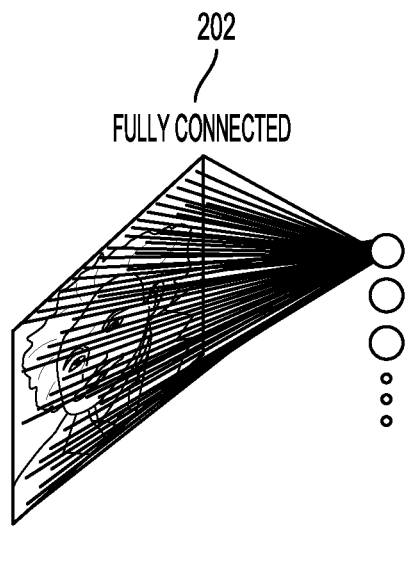
Figure 2C:
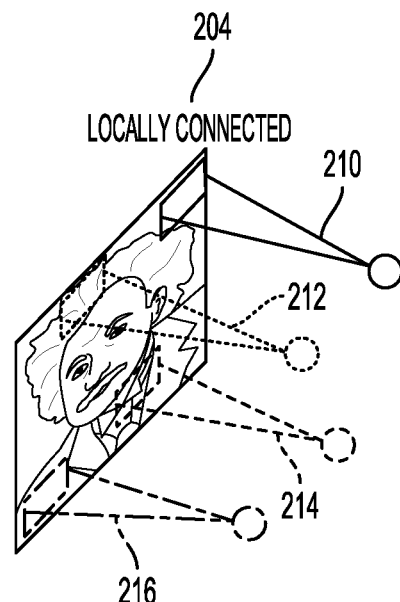
Figure 2C:
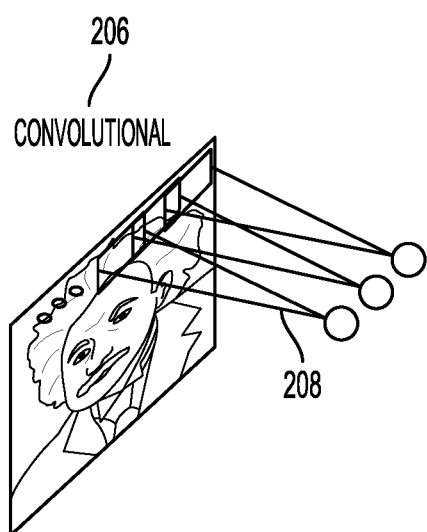

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
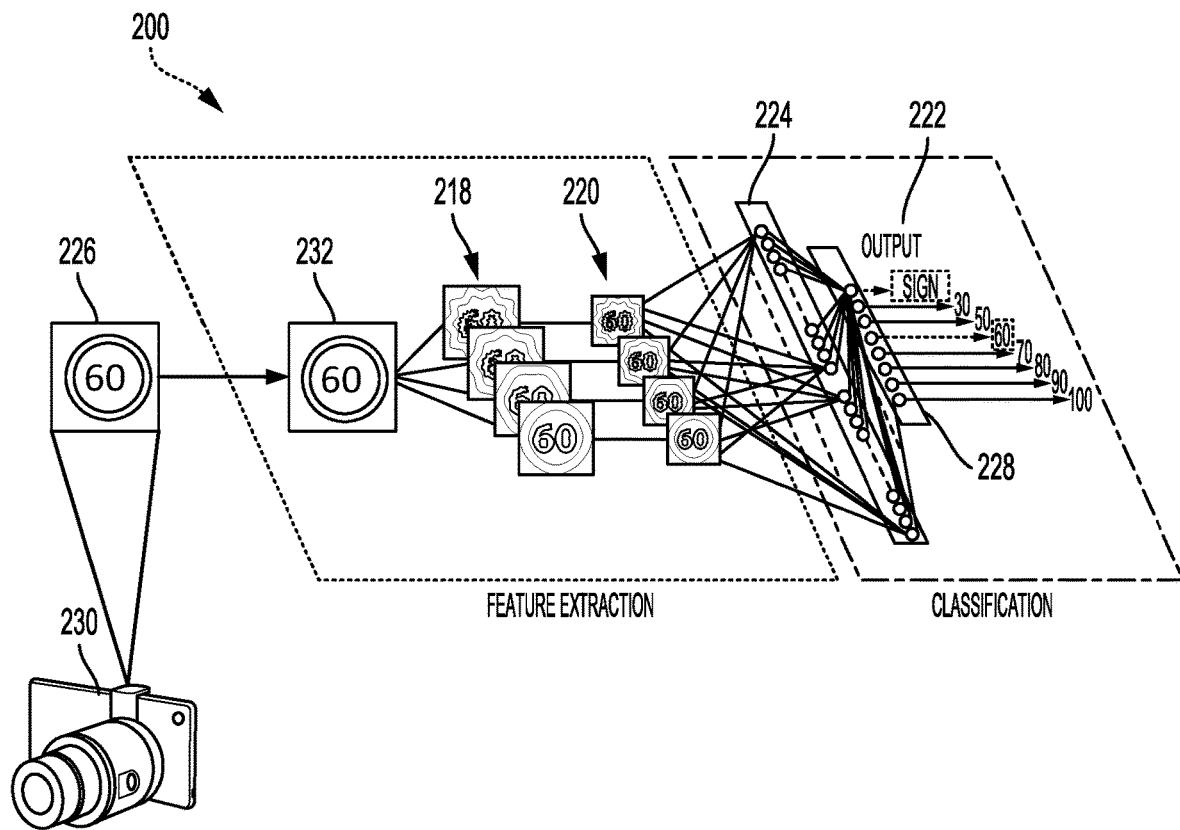
FIG. 2D is a diagram illustrating an exemplary deep convolutional network (DCN), in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 226) and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

As described, many streaming data input sources, such as inertial measurement unit (IMU) data, camera previews, video files, audio recordings, radar data, and Wi-Fi data, for instance, provide sequential data with substantial temporal similarity. That is, many, and in some cases a majority of, successive data points for such input sources are in the same distribution, and a small number of data points change distribution such that a new classification may be indicated. As such, significant resources may be expended repeatedly computing classification to produce the same result for many successive data points. To address these and other challenges, aspects of the present disclosure are directed to a two-stage sequential activity change detection and classification.

Figure 3:
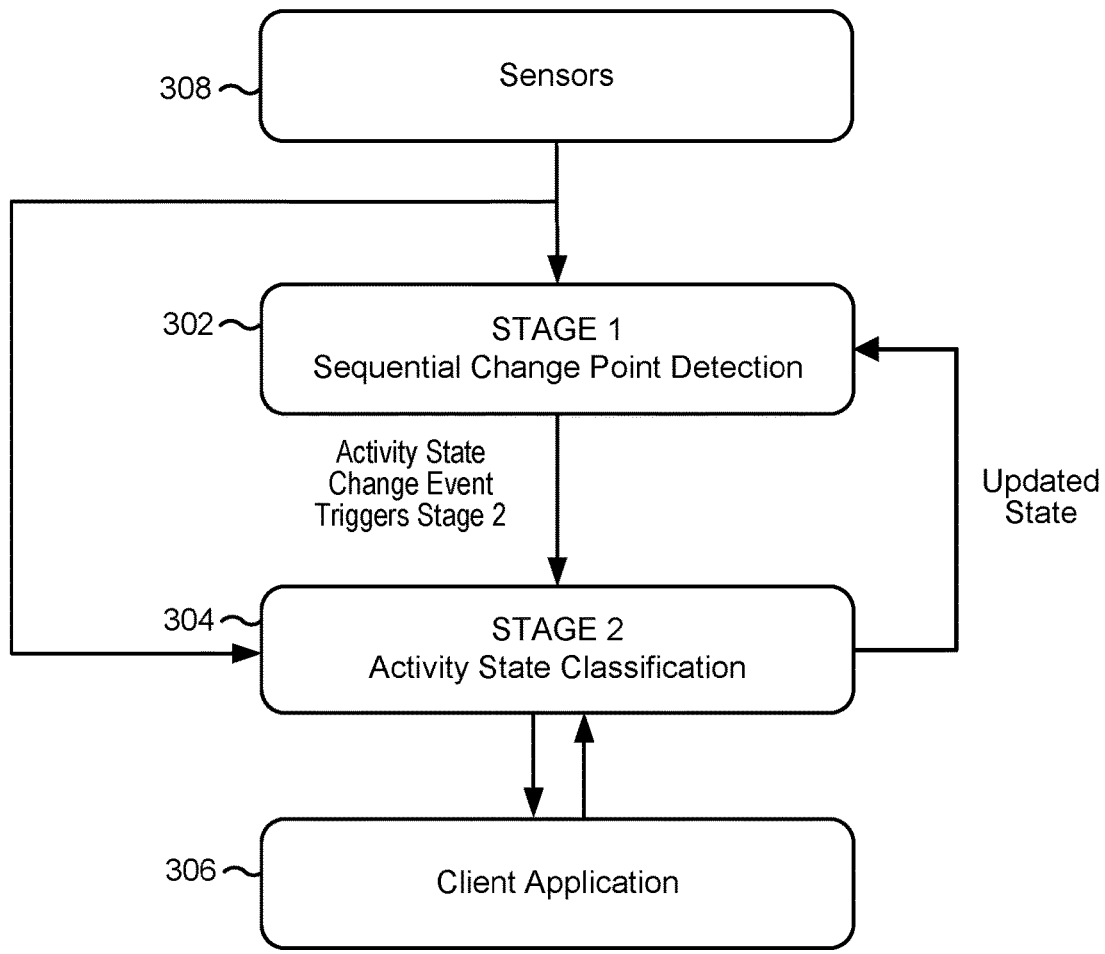
FIG. 3 is a block diagram illustrating an example system for energy efficient state change detection and classification, in accordance with aspects of the present disclosure.

FIG. 3 is a block diagram illustrating an example system 300 for energy efficient state change detection and classification, in accordance with aspects of the present disclosure. As shown in FIG. 3, the example system 300 may include a first stage 302, a second stage 304, a client application 306, and a sensor unit 308. Although, the first stage 302, the second stage 304, the client application 306, and the sensor unit 308 are shown as separate units, this is merely an example, for ease of explanation. Instead, one or more of the first stage 302, the second stage 304, the sensor unit 308, and the client application 306 may be included in a mobile device such as a smartphone, for example.

The first stage 302 may be implemented via a prediction model. In some aspects, the first stage 302 may be modeled as a Markov Decision Process. The first stage 302 may be configured to receive a stream of sequential data from the sensor unit 308. The sensor unit 308 may include one or more of an inertial measurement unit (IMU), a microphone, a camera, and other sensors. The client application 306 may, for example, be a smartphone navigation application or a fitness tracking application. The first stage 302 may be a low power and low complexity stage in comparison to the second stage 304. The first stage 302 may be configured to remain ON at all times, such that sensor data may be continuously received. Moreover, the first stage 302 may continuously monitor the sensor data to detect an activity change in the sequential data.

The second stage 304 may be configured to generate a prediction or a predictive inference of an activity state based on the sensor data. The second stage 304 may be implemented via a prediction model. In some aspects, the second stage 304 may be configured as a Bayesian network, and may provide a probabilistic activity context. The second stage 304 may be processed for example with a DSP or GPU, for instance. The second stage 304 may be maintained in an OFF state or low power state until the first stage 302 detects a change in the activity state. That is, the first stage 302 may predict whether an activity state (e.g., walk, run, stand) has changed based on the sensor data. If the first stage 302 determines that the activity state has changed, then the first stage 302 sends a signal (e.g., activity state change event) to the second stage 304 as a trigger for the second stage 304 to wake and compute an inference or classification of the activity. The second stage 304 may send a state update to the first stage 302 so the first stage 302 may continue monitoring the sensor data to determine if the activity state changes from the updated activity state. In some aspects, the second stage 304 may also report the updated activity classification to the client. The second stage 304 may return to the OFF state or low power state after sending the updated activity state to the first stage 302.

As described, continuous computation of activity context results via the second stage 304 is unnecessary when there is no change in the current activity state detected. Sequential detection using the first stage 302, in the example system 300 may operate and perform with fewer samples (low latency) to reach the same level of detection error in expectation. In addition, sequential detection beneficially provides a simple mechanism to tradeoff false alarm rate with detection latency via a threshold parameter (A) of cumulative log-likelihood ratio.

By applying sequential activity change detection using the first stage 302, false alarms may be reduced. A false alarm occurs when an activity state change is erroneously indicated. For instance, when the activity state is standing, but the sequential sensor data indicates that the subject being tracked (e.g., person) fidgets momentarily, using a one-shot approach, the activity state may be deemed to have changed. As such, using only the data corresponding to the fidgeting, the first stage 302 may incorrectly signal the second stage 304 to compute a classification when the activity state is not actually changed. This may result in excess energy consumption. Thus, instead of tracking all possible activity change events, a log-likelihood ratio function representing the confidence of deviation from the current activity state may be computed and aggregated. The log-likelihood ratio function may be given by:

$$CumLLR_t = \min\left\{CumLLR_{t-1} + \log\frac{p_{current\ activity}(x_t)}{p_{all\ other\ activities}(x_t)}, 0\right\} \quad (1)$$

$$CumLLR_t \overset{>}{\underset{<}{\quad}} \lambda, \quad (2)$$

where $CumLLR_t$ is the cumulative log-likelihood ratio at time t, $CumLLR_{t-1}$ is the cumulative log-likelihood ratio at time t-1, A is a threshold parameter that is tunable to meet false alarm/latency tradeoff, $x_t$ is a d-dimensional feature vector and is an operator that represents less than, greater than or equal to.

In some aspects, however, the class conditional density used in the sequential detection procedure may not be accessible. Additionally, it may be inefficient to estimate the two density functions (e.g., $P_{current\ activity}$ ($x_t$), Pall other activities ($x_t$)), and then separately take the log of the ratio. A more efficient approach may be to directly estimate the log density ratio function, avoiding the error incurred when taking the ratio of two density estimators near the tail of individual distribution. The log-likelihood ratio function may be estimated directly using an additive model as:

$$\log\frac{p_{current\ activity}(x_t)}{p_{all\ other\ activities}(x_t)} \approx \sum_{m=1}^{M} \alpha_m \cdot f_m(x_t), \quad (3)$$

where $f_m(\cdot)$ is a weak learner function, $\alpha_m$ is a weight associated with each weak learner function, and M is the number of weak learners. A weak learner is a model such as a one-level decision tree that may perform slightly better than guessing. By aggregating the results of multiple weak learners, the performance of the model may be boosted or improved. A boosted decision tree provides an efficient hardware-friendly implementation, as well as a straightforward accuracy/size tradeoff (increasing/reducing number of learners).

In some aspects, feature computation may be improved using a boosted decision tree approach aggregating features:

$$\Sigma_{m=1}^{M}\alpha_m f_m(\Omega_m(x_t)), \quad (4)$$

where $\Omega_m$ is a feature selector for each decision tree. In some aspects, the log-likelihood ratio estimator may be logistic regression model or a more complex neural network parameterization.

In addition, the feature computation may be improved by aggregating log-likelihood ratios over time t. However, rather than computing every feature at every time slot and feeding into a combined learner, a subset of the features per time slot may be computed as follows:

$$\Sigma_t \Sigma_{m \in S_t} \alpha_m \cdot f_m(\Omega_m(x_t)), \quad (5)$$

where $S_t$ is a feature subset selected at time t. In some aspects, the subset may be selected via random sampling or another selection policy. Because the features $x_t$ have a strong correlation over time, a sparse sub selection of the features may be performed instead of selecting them one by one and computing a prediction for each feature. By approximating the aggregated log-likelihood ratio statistics by feature-temporal decomposition, computation saving may be achieved.

Figure 4:
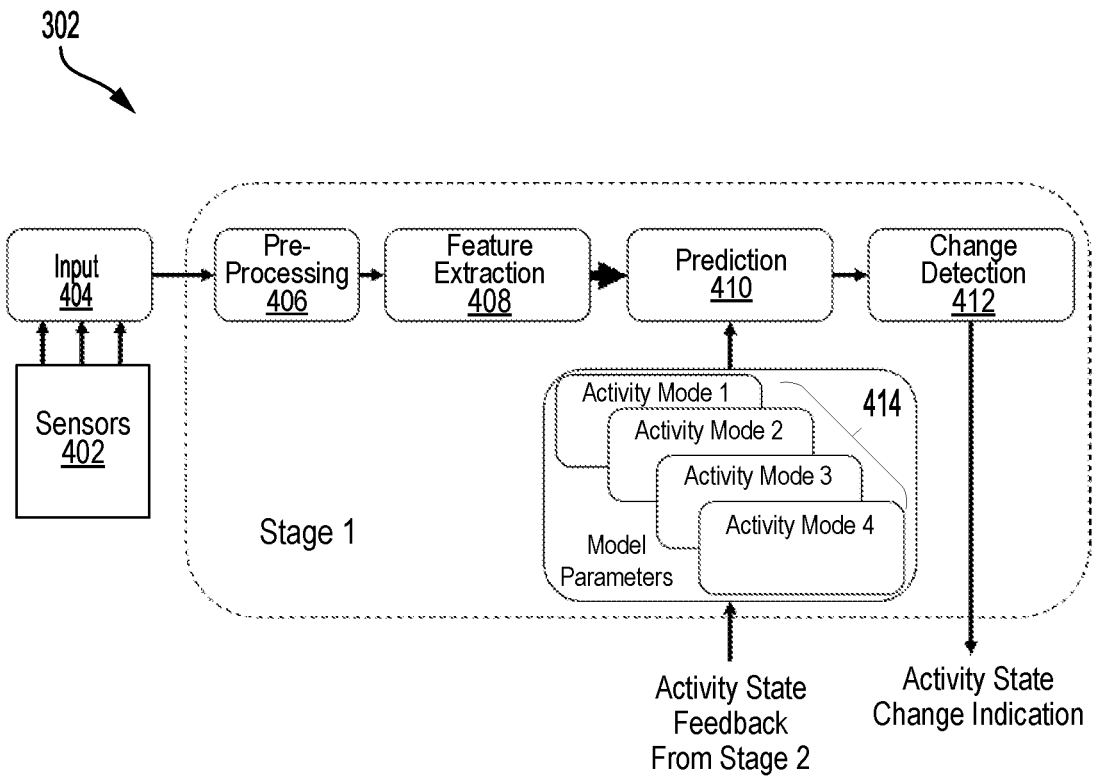
FIGS. 4 and 5 are diagrams that illustrate example architecture for state change detection and classification, respectively, in accordance with aspects of the present disclosure.
Figure 5:
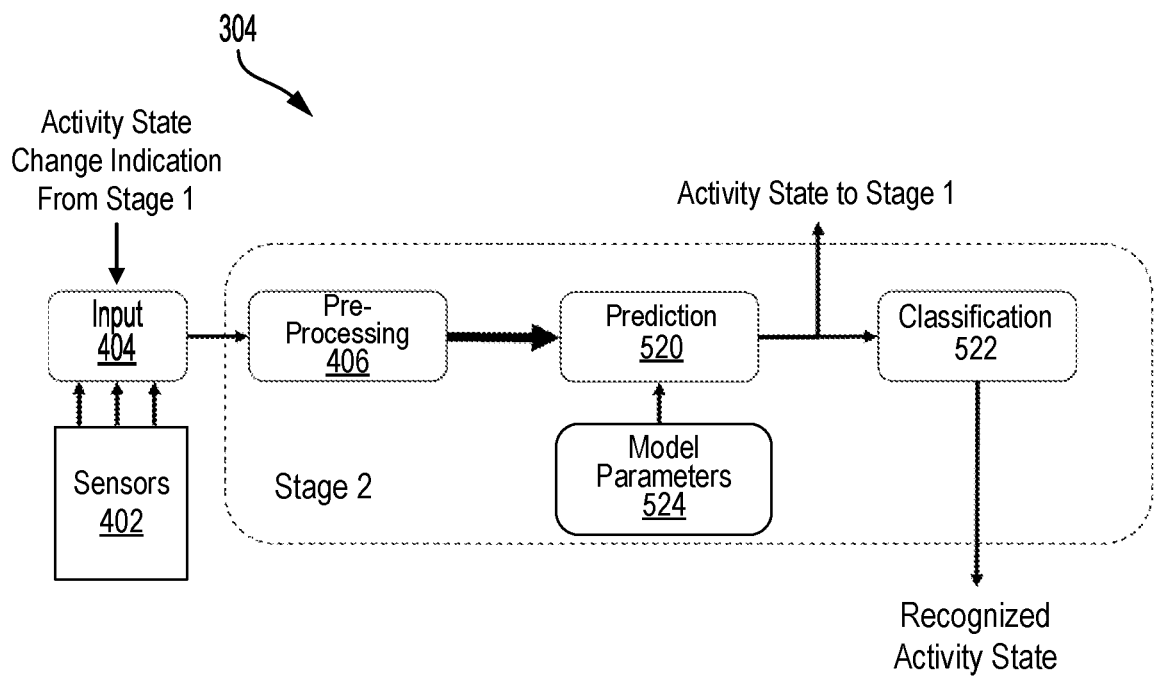

FIGS. 4 and 5 are diagrams that illustrate example architecture for state change detection and classification, respectively, in accordance with aspects of the present disclosure. Referring to FIG. 4, the example architecture for state change detection block (also referred to as first stage) 302 is shown. The example architecture for the state change detection block 302 may receive at an input 404, sequence data such as via one or more sensors 402 (e.g., sensors 114 shown in FIG. 1). In some aspects, input 404 may include a buffer for temporarily storing the sequence data provided by sensors 402. The sensors 402 may be a set of inertial measurement unit (IMU) sensors, a microphone, a camera, other sequential data input, or a combination thereof.

The sequence data may also be subjected to preprocessing via a pre-processing block 406. For instance, if the sequence data includes IMU data, it may be desirable to adjust the raw data to account for bias (e.g., accelerometer bias) or to arrange or reformat the data for evaluation. The sequence data may be supplied to feature extraction block 408.

The feature extraction block 408 may extract a set of features from the sequence data. In some aspects, the feature extraction block 408 may be implemented to extract features of the sequence data via principal component analysis, partial least squares, other dimensionality reduction techniques, and the like. In other aspects, the feature extraction block 408 may be implemented as an autoencoder. Additionally, in some aspects the feature extraction block 408 may be implemented as a convolutional neural network (e.g., convolutional neural network 206 of FIG. 2C). The extracted features of the sequence data may be supplied to the prediction block 410. The prediction block 410 may compare the extracted features to model parameters 414 corresponding to one or more activity states (e.g., activity mode 1 model parameters, activity mode 2 model parameters, activity mode 3 model parameters, or activity mode 4 model parameters) to generate a predictive inference of whether a change in the activity has occurred. For instance, the prediction block 410 may be implemented as a decision tree and may compute the log-likelihood ratio function of equation 1 at each time step. Each of the decision trees may compute the probability of an activity (e.g., fidgeting, walking, or biking (pedaling)). In some aspects, the log-likelihood ratio function may be estimated as indicated in equation 3.

The computed predictive inference may, in turn, be supplied to a change detection block 412. The change detection block 412 may compare the predictive inference to the threshold parameter A, which may be tunable according to a tradeoff between false alarm and latency. If, for example, the predictive inference is less than the threshold parameter, then it may be determine that the state has not changed. On the other hand, if, for example, the predictive inference is above the threshold value, a state change may be detected. The change detection block 412 may output a change indication that may be transmitted to the activity state classification block (also referred to as the second stage) 304.

Referring to FIG. 5, the activity state classification block 304 may also be configured to receive the sequence data via input 404. The sequence data may be supplied via one or more sensors 402 (e.g., sensors 114 shown in FIG. 1). The sensors 402 may be a set of inertial measurement unit (IMU) sensors, a microphone, a camera, other sequential data input, or a combination thereof. In addition, the activity state classification block 304 may receive the change indication from the state change detection block 302. However, the activity state classification block 304 may be maintained in an OFF or inactive state or a low power state, for example to conserve power. The activity state classification block 304 may receive the change indication from change detection block 412. If the change indication indicate that the activity state has not changed, then the activity state classification block 304 may remain in the inactive or low-power state.

On the other hand, if the change indication indicates that a state change has been detected, then the activity state classification block 304 may be controlled to an active state to resume processing of the sequence data. The activity state classification block 304 may take sequence data, which may be subjected to preprocessing (e.g., data segmentation or formatting) via pre-processing block 406. The prediction block 520 may extract features of the sequence data and generate a prediction of a current activity state (e.g., fidgeting, walking, running, bicycling) based on a set of model parameters 524. The prediction may then be supplied to a classification block 522 to generate a classification of the activity of the current time step. The classification block 522 may supply the classification to the state change detection block 302 for use in determining whether the sequence data at a next time step indicates an change from the current activity state. In some aspects, after supplying the classification, classification block 522 may return to the inactive or low power state.

Figure 6:
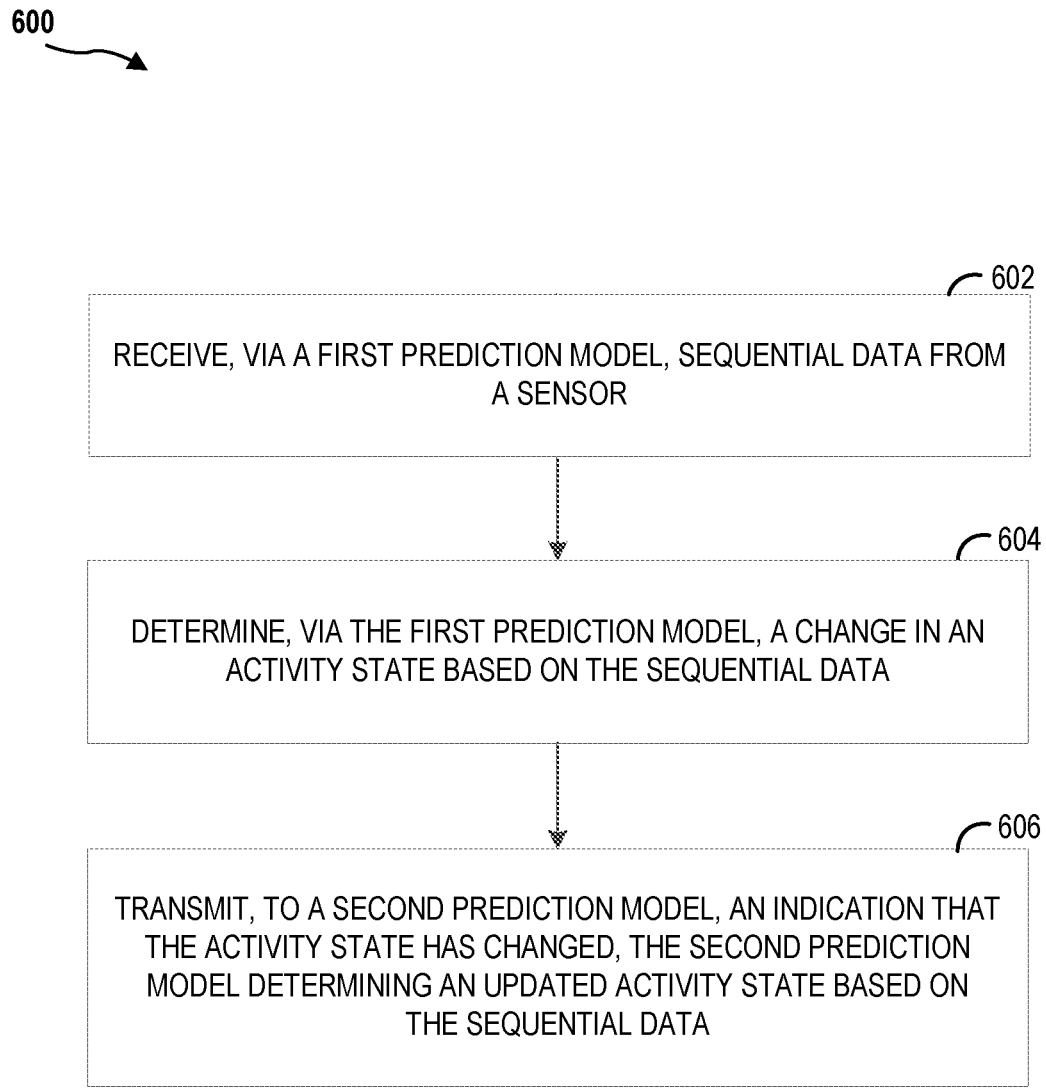
FIGS. 6 and 7 are flow diagrams illustrating a method of energy-efficient state change detection and classification of streaming sequential data, according to aspects of the present disclosure.

FIG. 6 is a flow diagram illustrating a method 600 of energy-efficient state change detection and classification of streaming sequential data, according to aspects of the present disclosure. In block 602, the method 600 receives, via a first prediction model, sequential data from a sensor. For instance, as described with reference to FIG. 5, the first stage 502 may be configured to receive a stream of sequential data from sensors 508. The sensors may be an inertial measurement unit (IMU). In some aspects, data from additional sensors, such as a microphone or camera, may also be included.

At block 604, the method 600 determines, via the first prediction model, a change in an activity state based on the sequential data. As described with reference to FIG. 5, the first stage 502 may predict whether an activity state (e.g., walk, run, stand) has changed based on the sensor data. In some aspects, the activity state change is determined based on a cumulative log-likelihood ratio function. For example, the change in the activity state may be determined if the cumulative log-likelihood ratio is greater than a tunable threshold parameter. The threshold parameter may be tuned to trade off false alarms and compute speed.

At block 606, the method 600 transmits, to a second prediction model, an indication that the activity state has changed. The second prediction model determines an updated activity state based on the sequential data. For example, as described, if the first stage 502 determines in block 510 that the activity state has changed, then the first stage 502 sends a signal to the second stage 504 to resume computation. The second stage 504 may compute an inference based on the sequential data indicating an updated activity state. The second stage 504 may send a state update to the first stage 502 so the first stage 502 may continue monitoring the sensor data to determine if the activity state changes from the updated activity state. In some aspects, the second stage 504 may also report the updated activity classification to the client. The second stage 504 may return to the OFF state or low power state after sending the updated activity state to the first stage 502.

Figure 7:
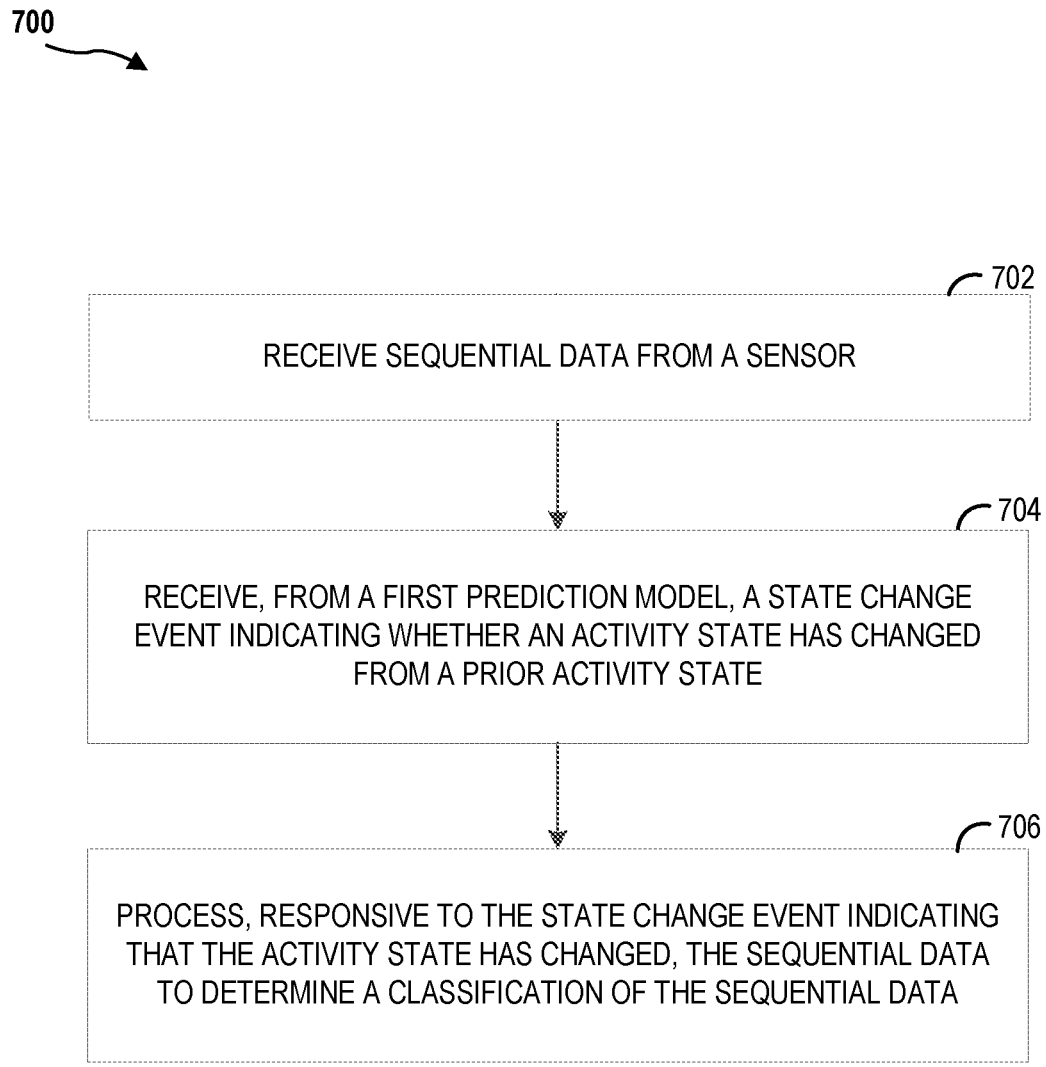

FIG. 7 is a flow diagram illustrating a method 700 of energy-efficient state change detection and classification of streaming sequential data, according to aspects of the present disclosure. In block 702, the method 700 receives sequential data from a sensor. As described with reference to FIG. 5, the activity state classification block 304 may also be configured to receive the sequence data via input 404. The sequence data may be supplied via one or more sensors 402 (e.g., sensors 114 shown in FIG. 1). The sensors 402 may be a set of inertial measurement unit (IMU) sensors, a microphone, a camera, other sequential data input, or a combination thereof.

At block 704, the method 700 receives, from a first prediction model, a state change event indicating whether an activity state has changed from a prior activity state. As described with reference to FIG. 5, the activity state classification block 304 may receive the change indication from the state change detection block 302.

At block 706, the method 700 processes, responsive to the state change event indicating that the activity state has changed, the sequential data to determine a classification of the sequential data. For instance, as described with reference to FIG. 5, if the change indication indicates that a state change has been detected, then the activity state classification block 304 may be controlled to an active state to resume processing of the sequence data. The activity state classification block 304 may take sequence data, which may be subjected to preprocessing (e.g., data segmentation or formatting) via pre-processing block 406. The prediction block 520 may extract features of the sequence data and generate a prediction of a current activity state (e.g., fidgeting, walking, running, bicycling) based on a set of model parameters. The prediction may then be supplied to a classification block 522 to generate a classification of the activity of the current time step. The classification block 522 may supply the classification to the state change detection block 302 for use in determining whether the sequence data at a next time step indicates a change from the current activity state.

On the other hand, if the change indication indicates that the activity state has not changed, then the activity state classification block 304 may remain in the inactive or low-power state. That is, because the change indication indicates that the activity state has not changed, computation of a classification for the sequential data at the current time period may be skipped. Instead, the activity state classification block 304 may set the classification of the sequential data at the current time to be equal to the activity state for the preceding time period. In some aspects, after supplying the classification, classification block 522 may return to the inactive or low power state.

In some aspects, the receiving means, the determining means, the processing means and/or the transmitting means, for example, include the CPU 102, program memory associated with the CPU 102, the dedicated memory block 118, and/or the routing connection processing unit 216 configured to perform the functions recited. In other configurations, the aforementioned means may be any module or any apparatus configured to perform the functions recited by the aforementioned means.

Implementation examples are provided in the following numbered clauses.

1. A method comprising:
receiving, via a first prediction model, sequential data from a sensor;
determining, via the first prediction model, a change in an activity state based on the sequential data; and
transmitting, to a second prediction model, an indication that the activity state has changed, the second prediction model determining an updated activity state based on the sequential data.

2. The method of clause 1, in which the first prediction model continuously predicts whether the activity state has changed and the second prediction model is inactive prior to receiving the indication of the activity stage change.

3. The method of clause 1 or 2, in which the sequential data comprises one or more of inertial measurement unit (IMU) sensor data, global navigation satellite system (GNSS) data, connectivity data, audio data, image data, barometric data, ambient light sensor data, or proximity sensor data.

4. The method of any of clauses 1-3, in which the first prediction model determines the change in the activity state based on a cumulative log-likelihood ratio function.

5. The method of clause any of clauses 1-4, in which the change in the activity state occurs when the cumulative log-likelihood ratio function is greater than a threshold parameter.

6. The method of clause any of clauses 1-5, in which the threshold parameter is adjustable to achieve a tradeoff between a false event rate and a detection latency.

7. The method of any of clauses 1-6, in which the cumulative log-likelihood ratio function is computed by inputting a testing sample into an estimator of the cumulative log-likelihood ratio function.

8. The method of any of clauses 1-7, in which the second prediction model, responsive to the indication that the activity state has changed, processes the sequential data to extract features of the sequential data and determines the update activity state based on the extracted features of the sequential data.

9. The method of any of clauses 1-8, in which the second prediction model supplies the updated activity state to the first prediction model and the first prediction model determines the change in the activity state based on the updated activity state.

10. A method comprising:
receiving sequential data from a sensor;
receiving, from a first prediction model, a state change event indicating whether an activity state has changed from a prior activity state; and
processing, responsive to the state change event indicating that the activity state has changed, the sequential data to determine a classification of the sequential data.

11. The method of clause 10, further comprising, skip processing of the sequential data to determine the classification of the sequential data in response to the state change event indicating that the activity state has not changed.

12. The method of clause 10 or 11, further comprising transmitting the classification to the first prediction model, the first prediction model using the classification to compute a next state change event.

13. The method of any of clauses 10-12, further comprising setting the classification of the sequential data for a current time period to the prior activity state in response to the state change event indicating that the activity state has not changed.

14. An apparatus comprising:
a memory; and
at least one processor coupled to the memory, the at least one processor being configured:
to receive, via a first prediction model, sequential data from a sensor;
to determine, via the first prediction model, a change in an activity state based on the sequential data; and
transmit, to a second prediction model, an indication that the activity state has changed, the second prediction model determining an updated activity state based on the sequential data.

15. The apparatus of clause 14, in which the at least one processor is further configured to continuously predict, via the first prediction model, whether the activity state has changed and in which the second prediction model is inactive prior to receiving the indication of the activity stage change.

16. The apparatus of clause 14 or 15, in which the sequential data comprises one or more of inertial measurement unit (IMU) sensor data, global navigation satellite system (GNSS) data, connectivity data, audio data, image data, barometric data, ambient light sensor data, or proximity sensor data.

17. The apparatus of any of clauses 14-16, in which the at least one processor is further configured to determine, via the first prediction model, the change in the activity state based on a cumulative log-likelihood ratio function.

18. The apparatus of any of clauses 14-17, in which the change in the activity state occurs when the cumulative log-likelihood ratio function is greater than a threshold parameter.

19. The apparatus of any of clauses 14-18, in which the threshold parameter is adjustable to achieve a tradeoff between a false event rate and a detection latency.

20. The apparatus of any of clauses 14-19, in which the at least one processor is further configured:
to receive, via the second prediction model, the indication that the activity state has changed;
to process the sequential data to extract features of the sequential data; and
to determine the updated activity state based on the extracted features of the sequential data.

21. The apparatus of any of clauses 14-20, in which the at least one processor is further configured:
to supply the updated activity state to the first prediction model as feedback;
and to return the section prediction model to an inactive state.

22. The apparatus of any of clauses 14-21, in which the first prediction model receives the updated activity state as feedback from the second prediction model.

23. An apparatus comprising:
a memory; and
at least one processor coupled to the memory, the at least one processor being configured:
to receive sequential data from a sensor;
to receive, from a first prediction model, a state change event indicating whether an activity state has changed from a prior activity state; and
to process, responsive to the state change event indicating that the activity state has changed, the sequential data to determine a classification of the sequential data.

24. The apparatus of clause 23, in which the at least one processor is further configured to skip processing of the sequential data to determine the classification of the sequential data in response to the state change event indicating that the activity state has not changed.

25. The apparatus of clause 23 or 24, in which the at least one processor is further configured to set the classification of the sequential data for a current time period to the prior activity state in response to the state change event indicating that the activity state has not changed.

26. The apparatus of any of clauses 23-25, in which the at least one processor is further configured to transmit the classification to the first prediction model, the first prediction model using the classification to compute a next state change event.

27. An apparatus comprising:
means for receiving, via a first prediction model, sequential data from a sensor;
means for determining, via the first prediction model, a change in an activity state based on the sequential data; and
means for transmitting, to a second prediction model, an indication that the activity state has changed, the second prediction model determining an updated activity state based on the sequential data.

28. The apparatus of clause 27, further comprising means for continuously predicting, via the first prediction model, whether the activity state has changed and the second prediction model is inactive prior to receiving the indication of the activity stage change.

29. The apparatus of clause 27 or 28, in which the sequential data comprises one or more of inertial measurement unit (IMU) sensor data, global navigation satellite system (GNSS) data, connectivity data, audio data, image data, barometric data, ambient light sensor data, or proximity sensor measurement unit data.

30. The apparatus of any of clauses 27-29, in which the first prediction model determines the change in the activity state based on a cumulative log-likelihood ratio function.

31. The apparatus of any of clauses 27-30, in which the change in the activity state occurs when the cumulative log-likelihood ratio function is greater than a threshold parameter.

32. The apparatus of any of clauses 27-31, in which the threshold parameter is adjustable to achieve a tradeoff between a false event rate and a detection latency.

33. The apparatus of any of clauses 27-32, further comprising means for computing the cumulative log-likelihood ratio function by inputting a testing sample into an estimator of the cumulative log-likelihood ratio function.

34. The apparatus of any of clauses 27-32, further comprising means for selecting the cumulative log-likelihood ratio function based on the updated activity state.

35. The apparatus of any of clauses 27-34, further comprising means for receiving, via the first prediction model, the updated activity state as feedback from the second prediction model.

36. An apparatus comprising:
means for receiving sequential data from a sensor;
means for receiving, from a first prediction model, a state change event indicating whether an activity state has changed from a prior activity state; and
means for processing, responsive to the state change event indicating that the activity state has changed, the sequential data to determine a classification of the sequential data.

37. The apparatus of clause 36, further comprising means for skipping processing of the sequential data to determine the classification of the sequential data in response to the state change event indicating that the activity state has not changed.

38. The apparatus of clause 36 or 37, further comprising means for transmitting the classification to the first prediction model, the first prediction model using the classification to compute a next state change event.

39. The apparatus of any of clauses 36-38, further comprising means for setting the classification of the sequential data for a current time period to the prior activity state in response to the state change event indicating that the activity state has not changed.

40. A non-transitory computer readable medium having encoded thereon program code, the program code being executed by a processor and comprising:
program code to receive, via a first prediction model, sequential data from a sensor;
program code to determine, via the first prediction model, a change in an activity state based on the sequential data; and
program code transmit, to a second prediction model, an indication that the activity state has changed, the second prediction model determining an updated activity state based on the sequential data.

41. The non-transitory computer readable medium of clause 40, further comprising program code to continuously predict, via the first prediction model, whether the activity state has changed and in which the second prediction model is inactive prior to receiving the indication of the activity stage change.

42. The non-transitory computer readable medium of clause 40 or 41, in which the sequential data comprises one or more of inertial measurement unit (IMU) sensor data, global navigation satellite system (GNSS) data, connectivity data, audio data, image data, barometric data, ambient light sensor data, or proximity sensor data.

43. The non-transitory computer readable medium of any of clauses 40-42, further comprising program code to determine, via the first prediction model, the change in the activity state based on a cumulative log-likelihood ratio function.

44. The non-transitory computer readable medium of any of clauses 40-43, in which the change in the activity state occurs when the cumulative log-likelihood ratio function is greater than a threshold parameter.

45. The non-transitory computer readable medium of any of clauses 40-44, in which the threshold parameter is adjustable to achieve a tradeoff between a false event rate and a detection latency.

46. The non-transitory computer readable medium of any of clauses 40-45, further comprising program code to compute the cumulative log-likelihood ratio function by inputting a testing sample into an estimator of the cumulative log-likelihood ratio function.

47. The non-transitory computer readable medium of any of clauses 40-45, further comprising program code to select the cumulative log-likelihood ratio function based on the updated activity state.

48. The non-transitory computer readable medium of any of clauses 40-47, further comprising program code to receive, via the first prediction model, the updated activity state as feedback from the second prediction model.

49. A non-transitory computer readable medium having encoded thereon program code, the program code being executed by a processor and comprising:
program code to receive sequential data from a sensor;
program code to receive, from a first prediction model, a state change event indicating whether an activity state has changed from a prior activity state; and
program code to process, responsive to the state change event indicating that the activity state has changed, the sequential data to determine a classification of the sequential data.

50. The non-transitory computer readable medium of clause 49, further comprising program code to skip processing of the sequential data to determine the classification of the sequential data in response to the state change event indicating that the activity state has not changed.

51. The non-transitory computer readable medium of clause 49 or 50, further comprising program code to set the classification of the sequential data for a current time period to the prior activity state in response to the state change event indicating that the activity state has not changed.

52. The non-transitory computer readable medium of any of clauses 49-51, further comprising program code to transmit the classification to the first prediction model, the first prediction model using the classification to compute a next state change event.

The various operations of methods described above may be performed by any suitable means capable of performing the corresponding functions. The means may include various hardware and/or software component(s) and/or module (s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used, include compact disc (CD), laser disc, optical disc, digital versatile disc (DVD), floppy disk, and Blu-ray® disc where disks usually reproduce data magnetically, while discs reproduce data optically with lasers. Thus, in some aspects, computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A processor-implemented method, performed by at least one processor, the processor-implemented method comprising:
    receiving, by a first prediction model, sequential data from a sensor related to an activity of one or more of a human or an object;
    determining, via the first prediction model, a change in an activity state based on an estimate of a log-likelihood ratio (LLR) function for the sequential data; and
    transmitting, to a second prediction model, an indication that the activity state has changed, the indication triggering the second prediction model to wake from an inactive state and determine an updated activity state of the one or more of the human or the object based on the sequential data;
    wherein the change in the activity state of the one or more of the human or the object occurs when the estimate of the log-likelihood ratio function is greater than a threshold parameter, which is adjustable to achieve a tradeoff between a false alarm rate and a detection latency.

2. The processor-implemented method of claim 1, in which the first prediction model continuously predicts whether the activity state of the one or more of the human or the object has changed and the second prediction model is inactive prior to receiving the indication of the activity stage change.

3. The processor-implemented method of claim 1, in which the sequential data comprises one or more of inertial measurement unit (IMU) sensor data, global navigation satellite system (GNSS) data, connectivity data, audio data, image data, barometric data, ambient light sensor data, or proximity sensor data.

4. The processor-implemented method of claim 1, in which the first prediction model determines the change in the activity state of the one or more of the human or the object at a time t based on a sum of the estimate of the log-likelihood ratio function at a time t-1 and the estimate of the log-likelihood ratio function at the time t.

5. The processor-implemented method of claim 1, in which the second prediction model, responsive to the indication that the activity state of the one or more of the human or the object has changed, processes the sequential data to extract features of the sequential data and determines the update activity state of the one or more of the human or the object based on the extracted features of the sequential data.

6. The processor-implemented method of claim 5, in which the second prediction model supplies the updated activity state of the one or more of the human or the object to the first prediction model and the first prediction model determines the change in the activity state based on the updated activity state of the one or more of a human or an object.

7. An apparatus comprising:
    at least one memory; and
    at least one processor coupled to the at least one memory, the at least one processor being configured to:
        receive, via a first prediction model, sequential data related to an activity of one or more of a human or an object from a sensor;
        determine, via the first prediction model, a change in an activity state based on an estimate of a log-likelihood ratio (LLR) function for the sequential data; and
        transmit, to a second prediction model, an indication that the activity state has changed, the indication triggering the second prediction model to wake from an inactive state and determine an updated activity state of the one or more of the human or the object based on the sequential data;
        wherein the change in the activity state of the one or more of the human or the object occurs when the estimate of the log-likelihood ratio function is greater than a threshold parameter, which is adjustable to achieve a tradeoff between a false alarm rate and a detection latency.

8. The apparatus of claim 7, in which the at least one processor is further configured to continuously predict, by the first prediction model, whether the activity state of the one or more of the human or the object has changed and in which the second prediction model is inactive prior to receiving the indication of the activity stage change.

9. The apparatus of claim 7, in which the sequential data comprises one or more of inertial measurement unit (IMU) sensor data, global navigation satellite system (GNSS) data, connectivity data, audio data, image data, barometric data, ambient light sensor data, or proximity sensor data.

10. The apparatus of claim 7, in which the at least one processor is further configured to determine, via the first prediction model, the change in the activity state of the one or more of the human or the object at a time t based on a sum of the estimate of the log-likelihood ratio function at a time t-1 and the estimate of the log-likelihood ratio function at the time t.

11. The apparatus of claim 7, in which the at least one processor is further configured to:
   receive, via the second prediction model, the indication that the activity state of the one or more of the human or the object has changed;
   process the sequential data to extract features of the sequential data; and
   determine the updated activity state of the one or more of the human or the object based on the extracted features of the sequential data.

12. The apparatus of claim 11, in which the at least one processor is further configured to:
   supply the updated activity state of the one or more of the human or the object to the first prediction model as feedback; and
   return the section prediction model to an inactive state.

13. The apparatus of claim 12, in which the first prediction model receives the updated activity state of the one or more of the human or the object as feedback from the second prediction model.

\* \* \* \* \*